United States Patent Office 2,724,192
Patented Nov. 22, 1955

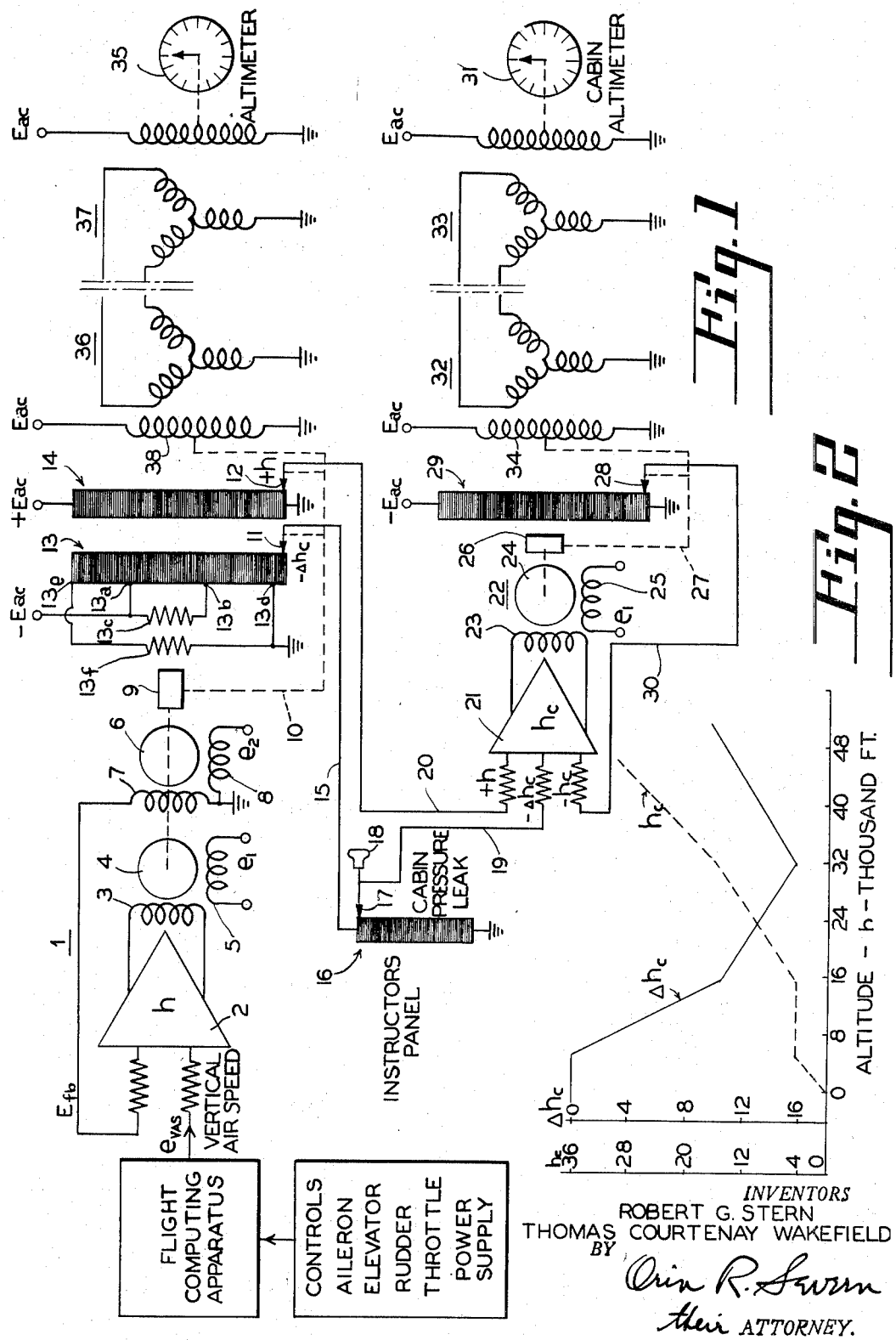

2,724,192
SIMULATED CABIN PRESSURIZING SYSTEM FOR TRAINING AIRCRAFT PERSONNEL

Robert G. Stern, Caldwell, and Thomas Courtenay Wakefield, Denville, N. J., assignors to Curtiss-Wright Corporation, a corporation of Delaware Application March 27, 1952, Serial No. 278,888

11 Claims. (Cl. 35—12)

This invention relates to simulated aircraft ground training systems, and particularly to a simulated cabin pressurizing system for representing high altitude operation of aircraft.

In actual aircraft having cabin pressurizing, a predetermined schedule is maintained either by the flight engineer or automatically by the pressure control system, of cabin altitude in relation to airplane altitude. The cabin pressurization is most effective up to a predetermined altitude beyond which it becomes decreasingly ineffective until the cabin altitude, i. e. the altitude corresponding to the cabin pressure, increases at the same rate as the aircraft altitude.

For example, in one type of military aircraft having a pressurized cabin, the pressure system remains inoperative until the aircraft reaches a predetermined altitude, say 5000 ft. At that altitude the pressure pump or compressor starts to operate and is regulated so as to maintain the cabin altitude at approximately 5000 ft. until the aircraft reaches, say 15,000 ft. At this pressure differential there may be material loss of air due to leakage. Above 15,000 ft. aircraft altitude the schedule calls for gradual increase in the pressure differential due to the limited capacity of the compressor, but at a lower rate than increase in aircraft altitude up to about 30,000 ft. where the cabin altitude is approximately 15,000 ft. This represents the capacity limit of the compressor. At altitudes above 30,000 ft. the output of the compressor remains substantially constant and the cabin altitude increases at the same rate as the aircraft altitude. The same schedule is maintained in the case of decreasing altitude.

The present invention has for its principal object an improved and realistic system for simulating a cabin pressurizing operating schedule of the above character for the ground training of aircraft personnel.

This invention will be more fully set forth in the following description referring to the accompanying drawing, and the features of novelty which characterize the invention will be pointed out with particularity in the claims annexed to and forming a part of this specification.

Referring to the drawing, Fig. 1 is a partly diagrammatic and schematic view of an electric system adapted to be used in connection with conventional flight training and computing apparatus for practicing the present invention; and Fig. 2 is a chart illustrating a cabin pressurizing schedule.

Referring to Fig. 1, an electrical servo system of the integrating type is indicated by the reference numeral 1 for representing the altitude of the simulated flight, i. e. the aircraft altitude. This servo system includes a summing amplifier 2 of conventional type that is energized as indicated by an alternating current voltage $e_{VAS}$ representing vertical airspeed. This vertical airspeed voltage may be variable as to instant polarity and magnitude for representing positive or negative rate of climb and is produced in accordance with the student pilot's manipulation of simulated aileron, elevator, rudder and throttle aircraft controls through suitable flight computing apparatus such as that disclosed in a co-pending application Ser. No. 134,623, filed December 23, 1949 by Robert G. Stern for "Aircraft Training Apparatus for Simulating Landing and Related Maneuvers" and assigned to the same assignee as the present invention.

The output voltage of the amplifier 2 energizes the control winding 3 of a two-phase motor 4, the other winding 5 of which is energized by a fixed alternating current reference voltage $e_1$ that is dephased 90° with respect to the control voltage. Accordingly it will be seen that direction and speed of rotation of the motor 4 depends on the phase relationship and magnitude of the voltage in the control winding 3 which in turn depends on the character of the vertical airspeed voltage. For purposes of linear response, the motor 4 is connected to a feed-back generator 6 having a feed-back winding 7 connected to the input side of the amplifier 2. A reference winding 8 is energized by a fixed A. C. voltage $e_2$ also dephased 90° with respect to the feed back voltage $E_{fb}$. The motor-generator is connected as indicated to a suitable gear reducer 9 that is in turn mechanically connected as indicated at 10 to movable slider contacts 11 and 12 of the potentiometers 13 and 14 respectively.

The potentiometers 13 and 14 are of the well-known card-wound circular type but are shown developed in plan view for facilitating description of the operation.

The slider contacts are shown at the position of zero altitude and are moved upward as the altitude servomotor 4 simulates increased altitude. The potentiometer 13 is energized by a fixed alternating current voltage $-E_{ac}$ and the potentiometer 14 is energized by a similar fixed alternating current voltage $+E_{ac}$ the voltages as indicated being of opposite instantaneous polarity, i. e. 180° out of phase. The voltages derived from the potentiometer 13 at the slider 11 represent a pressure decrement or difference between the cabin interior and exterior in a predetermined scheduled relation to flight altitude.

In other words, translating pressure to corresponding altitude the aforesaid schedule represents the difference between airplane altitude $h$ and cabin altitude $h_c$ as a function of airplane altitude. This difference or decrement is represented by the voltage $\Delta h_c$.

The scheduled relationship above described may be obtained in any suitable manner by potentiometer contouring, shunt circuits, etc. and is herein illustrated as accomplished by a substantially linear-wound potentiometer having shunt circuits and taps located at predetermined points. Specifically, the voltage $-E_{ac}$ energizes the potentiometer at two points, namely at an intermediate tap 13a in the upper range of the potentiometer and at an intermediate lower tap 13d through a resistance 13c. A lower part of the potentiometer is grounded at tap 13b representing 5000 ft. altitude, and the upper limit of the potentiometer at tap 13e is grounded through a resistance 13f. This potentiometer arrangement results in a derived voltage at slider 11 corresponding to the decrement chart of Fig. 2 as will be hereinafter described.

For purpose of simulating cabin pressure leak the decrement voltage $\Delta h_c$ may be modified by an instructor according to the amount of leak simulated. To this end the decrement voltage $\Delta h_c$ is fed by conductor 15 to a potentiometer 16 located at the instructor's station or panel. The opposite end of the leak potentiometer is grounded and a slider 17 is arranged to be adjusted manually at 18 by the instructor to represent a leak condition ranging from normal to full leak, i. e. absence of cabin pressurization represented by the lower grounded position. This modified decrement voltage and the altitude voltage $h$ derived from the potentiometer 14 are fed by conductors 19 and 20 to the input side of a servo amplifier 21 for controlling a self-positioning servo system 22.

It will be noted that the voltages $h$ and $\Delta h_c$ are of opposite polarity so that the servo amplifier 21 determines the quantity $h_c$, i. e. the cabin altitude, by solving the equation:

$$h - \Delta h_c = h_c$$

The amplifier output voltage which is determined as hereinafter described energizes a control coil 23 of a two-phase motor 24 of the type above described, the other winding 25 being energized by a reference A. C. voltage $e_1$ that is dephased 90° with respect to the control voltage $h_c$. The motor 24 is mechanically connected as indicated through a gear reducer 26 and mechanical connection 27 to the slider contact 28 of an "answer" potentiometer 29. The answer potentiometer is energized by a voltage $-E_{ac}$ and the derived voltage is fed by conductor 30 to the input side of the amplifier 21 for balancing the voltage $h - \Delta h_c$ to automatically position the servo in well-known manner to represent the value of $h_c$. That is, the servo comes to rest when the output of amplifier 21 is zero, thus representing a solution of the equation:

$$h - \Delta h_c - h_c = 0$$

A cabin altitude indicator 31 may be controlled in any suitable manner in accordance with the position of the servo through the gear box 26 and connection 27. As shown, a remote control synchronous transmitter and receiver 32 and 33 are used by connecting the movable coil 34 of the transmitter 32 to the connection 27. In like manner, an indicator 35 representing an altimeter is positioned by the servo 1 through the transmitter-receiver 36, 37, the movable coil 38 being driven through connection 10.

Referring now to the chart of Fig. 2 which is to be interpreted in connection with the scheduling potentiometer 13 of the altitude servo, the scheduled altitude decrement is represented by the curve $\Delta h_c$ and the cabin altitude by the curve $h_c$. Starting from zero altitude, i. e. the lower limit of the potentiometer, it will be noted that the decrement remains zero up to 5000 ft. represented by the tap 13d. In other words the slider 11 remains at ground or zero potential within this range so that $h_c$ increases simultaneously with $h$ as in actual practice. From 5000 ft. to 15,000 ft. which is represented by tap 13b, the value of $\Delta h_c$ is determined so that it is equal and opposite in value to increase in the value of $h$ thereby maintaining the value of $h_c$ constant throughout this range. This ratio is determined by the value of the resistance of the potentiometer and the tap locations. From 15,000 to 30,000 ft. altitude which is represented by the tap 13a the rate of change of $\Delta h_c$ decreases somewhat in relation to altitude so that $h_c$ now starts to rise but at a lower rate than $h$, the flight altitude. This relationship is determined by the value of resistance 13c in combination with the value of the shunted potentiometer resistance. At 30,000 ft. it will be noted that the cabin altitude $h_c$ has climbed to approximately 15,000 ft. Above this point and up to the aircraft ceiling represented by tap 13e the value of $\Delta h_c$ increases but at a lower rate than flight altitude by reason of the resistance 13f in the ground connection from the upper limit of the potentiometer. The value of $h_c$ continues to climb but at an increased rate that is now approximately equal to the rate of flight altitude increase.

Assuming now that the instructor decides to introduce cabin pressure leak, he adjusts the slider 17 of the leak potentiometer 16 at some intermediate point thereby decreasing the voltage $\Delta h_c$ at the input side of amplifier 21. Accordingly, the value of $h_c$ is correspondingly increased thus simulating decrease of cabin pressure. In the case of full leak, the slider 17 is grounded so that $\Delta h_c$ is zero and $h_c$ equals $h$, thus simulating complete loss of pressurization.

It will therefore be seen that the present invention simulates a cabin pressurizing schedule in a realistic and practical manner for the ground training of aircraft personnel. The altitude and cabin altitude indicators would normally be located in the trainer cockpit which may be of conventional type as previously indicated.

It should be understood that this invention is not limited to specific details of construction and arrangement thereof herein illustrated, and that changes and modifications may occur to one skilled in the art without departing from the spirit of the invention.

What is claimed is:

1. A simulated cabin pressurizing system for training aircraft personnel comprising a first deriving means responsive to variations in altitude of a simulated flight for deriving a control quantity representing aircraft altitude, a second deriving means also responsive to said altitude variations for deriving control quantities representing a pressure decrement schedule of cabin altitude in relation to aircraft altitude, means adjustable by an instructor for modifying said decrement control quantities for representing cabin pressure leak, means jointly responsive to said altitude and modified decrement control quantities, and an indicator responsive to said last-named means for representing cabin altitude.

2. A simulated cabin pressurizing system for training aircraft personnel comprising a first voltage deriving means responsive to variations in altitude of a simulated flight for deriving a voltage representing aircraft altitude, a second voltage deriving means also responsive to said altitude variations for deriving voltages representing a pressure decrement schedule of cabin altitude in relation to aircraft altitude, means operable by an instructor for modifying said decrement voltages to represent cabin pressure leak, amplifier means jointly repsonsive to said altitude and modified decrement voltages, and an indicator operatively responsive to said last-named means for representing cabin altitude.

3. A simulated cabin pressurizing system for training aircraft personnel comprising a first potentiometer responsive to variations in altitude of a simulated flight for deriving a voltage representing aircraft altitude, a second potentiometer having non-linear characteristics responsive to said altitude variations for deriving voltages representing a pressure decrement schedule of cabin altitude in relation to aircraft altitude, means for modifying said decrement voltages according to simulated cabin pressure leak, an electrical system jointly responsive to said altitude and modified decrement voltages, and an indicator operatively responsive to said system for representing cabin altitude.

4. A simulated cabin pressurizing system for training aircraft personnel comprising a servo system responsive to variations in altitude of a simulated flight, means for representing a pressure decrement schedule of cabin altitude in relation to aircraft altitude as modified by cabin pressure leak jointly controlled by said servo system and an instructor, an electrical system jointly responsive to said decrement representing means and said servo system, and an indicator representing cabin altitude responsive to said electrical system.

5. A simulated cabin pressurizing system for training aircraft personnel comprising a first electrical servo system responsive to variations in altitude of a simulated flight, voltage deriving means for representing a pressure decrement schedule of cabin altitude in relation to aircraft altitude as modified by cabin pressure leak jointly controlled by said first servo system and an instructor, a second electrical system jointly responsive to said voltage deriving means and said first servo system, and an indicator representing cabin altitude responsive to said second system.

6. A simulated cabin pressurizing system for training aircraft personnel comprising a first electrical servo system responsive to variations in altitude of a simulated flight including voltage deriving means for representing a pressure decrement schedule of cabin altitude in relation to aircraft altitude, means representing cabin pressure leak energized from said voltage deriving means and controlled by an instructor, a second electrical system jointly responsive to said leak representing means and said first servo system, and an indicator representing cabin altitude responsive to said second system.

7. A simulated cabin pressurizing system for training aircraft personnel comprising a first means adjustable according to simulated flight altitude, a second means responsive to said first means for scheduling a relationship between cabin altitude and flight altitude, a third means adjustable by an instructor for modifying the aforesaid scheduling relationship for representing cabin pressure leak, an electrical system jointly responsive to said first and third means, and an indicator controlled by said electrical system for indicating cabin altitude.

8. A simulated cabin pressurizing system for training aircraft personnel comprising a first electrical integrating servo system responsive to variations in altitude of a simulated flight including two potentiometers each adjustable according to altitude for deriving respective voltages representing aircraft altitude and a pressure decrement in a scheduled relationship of cabin altitude to aircraft altitude, a third potentiometer energized by said decrement voltage and adjustable by an instructor for modifying said decrement voltage to represent cabin pressure leak, a second electrical self-positioning servo system jointly responsive to said modified voltage and said altitude voltage, and an indicator representing cabin altitude responsive to said second servo system.

9. A simulated cabin pressurizing system for training aircraft personnel comprising a first electrical integrating servo system responsive to variations in altitude of a simulated flight including two potentiometers each energized by a fixed voltage and adjustable according to altitude, one of said potentiometers adapted for deriving voltages representing aircraft altitude and the other potentiometer being designed to represent a scheduled relationship of cabin altitude to aircraft altitude for deriving a voltage representing the difference between said altitudes, a third potentiometer energized by said difference voltage and adjustable by an instructor for modifying said difference voltage to represent cabin pressure leak, a second electrical self-positioning servo system jointly responsive to said modified voltage and said altitude voltage, and an indicator representing cabin altitude responsive to said second servo system.

10. A simulated cabin pressurizing system for training aircraft personnel comprising a first electrical integrating servo system including a first and second potentiometer each having a resistance winding energized by a fixed voltage and having a slider contact which is moved along the resistance winding according to variations in altitude of a simulated flight, the first potentiometer being adapted for deriving voltages at the slider contact thereof representative of aircraft altitude, the second potentiometer being designed to derive voltages at the slider contact representative of the difference between cabin altitude and aircraft altitude according to a scheduled relationship, a third potentiometer energized by the output voltage of the second potentiometer and including a slider contact adjustable by an instructor for modifying the aforesaid difference voltages according to simulated cabin pressure leak, a second electrical self-positioning servo system having the voltages derived from the first and third potentiometers as input voltages, and an indicator representing cabin altitude responsive to said second servo system.

11. A simulated cabin pressurizing system for training aircraft personnel comprising a first electrical integrating servo system including a first and second potentiometer each having a resistance winding energized by a fixed voltage and having a slider contact which is moved along the resistance winding according to variations in altitude of a simulated flight, the first potentiometer being adapted for deriving voltages at the slider contact thereof representative of aircraft altitude, the second potentiometer having its resistance winding substantially linearly wound and including a resistor connected across intermediate taps on the winding with one of the taps being connected to the energizing voltage, said second potentiometer also including another resistor connected across another portion of the resistance winding including said first portion such that voltages representative of the difference between cabin altitude and aircraft altitude according to a predetermined scheduled relationship are obtainable at the slider contact of the second potentiometer, a third potentiometer including a resistance winding energized by said difference voltages and including a slider contact adjustable by an instructor for modifying the difference voltages according to simulated cabin pressure leak, a second electrical self-positioning servo system energized by the voltages derived from the first and third potentiometers and an indicator representing cabin altitude responsive to said second servo system.

References Cited in the file of this patent

UNITED STATES PATENTS

| | | |
|---|---|---|
| 2,496,617 | Burelbach | Feb. 7, 1950 |
| 2,499,597 | Lukacs | Mar. 7, 1950 |
| 2,556,964 | Giroud | June 12, 1951 |